US010040640B2

(12) United States Patent
Boyce et al.

(10) Patent No.: US 10,040,640 B2

(45) Date of Patent: Aug. 7, 2018

(54) SIDE-BY-SIDE REDUCER CONVEYOR

(71) Applicant: Intelligrated Headquarters, LLC, Mason, OH (US)

(72) Inventors: J. Bryan Boyce, Ballwin, MO (US); Justin Brouk, Cincinnati, OH (US); Walter Bates Hammond, Monroe, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 15/585,454

(22) Filed: May 3, 2017

(65) Prior Publication Data

US 2017/0320676 A1 Nov. 9, 2017

Related U.S. Application Data

(60) Provisional application No. 62/331,609, filed on May 4, 2016.

(51) Int. Cl.

*B65G 47/31* (2006.01)
*B65G 13/07* (2006.01)
*B65G 43/10* (2006.01)
*B65G 39/18* (2006.01)
*B65G 47/68* (2006.01)

(52) U.S. Cl.

CPC ............. *B65G 47/31* (2013.01); *B65G 13/07* (2013.01); *B65G 39/18* (2013.01); *B65G 43/10* (2013.01); *B65G 47/68* (2013.01); *B65G 47/681* (2013.01)

(58) Field of Classification Search

CPC ........ B65G 47/31; B65G 13/07; B65G 43/10; B65G 47/681; B65G 39/18; B65G 13/071; B65G 47/68

USPC ........................................................ 198/786

See application file for complete search history.

(56) References Cited

U.S. PATENT DOCUMENTS 1,946,458 A * 1/1933 Evans .................. B65G 47/681 198/448
4,019,620 A * 4/1977 Frenkel ................ B65G 47/681 198/399
4,264,002 A * 4/1981 Van Der Schie ...... B65G 13/08 198/361
5,092,447 A * 3/1992 Wyman ................ B65G 47/086 198/374

(Continued)

FOREIGN PATENT DOCUMENTS

WO WO-2009/029091 A1 3/2009

OTHER PUBLICATIONS

International Search Report and Written Opinion of the International Searching Authority for International Patent Application No. PCT/US2017/031005, dated Jul. 25, 2017, 11 pages.

*Primary Examiner* — Mark A Deuble

(74) *Attorney, Agent, or Firm* — Alston & Bird LLP

(57) ABSTRACT

A side-by-side reducer (SSR) conveyor has one lateral side of driven rollers operating at a different longitudinal running speed than another lateral side of driven rollers. The one lateral has an input section of driven rollers skewed away from the other lateral side followed by a converging zone of driven rollers skewed toward the other lateral side. The separation prevents frictional contact between side-by-side cartons so that one can be longitudinally moved a different velocity than the other to converge in a tandem arrangement.

11 Claims, 9 Drawing Sheets

(56) References Cited

U.S. PATENT DOCUMENTS 5,101,958 A * 4/1992 LeMay .................. B65G 47/71
198/436
5,400,896 A * 3/1995 Loomer ................. B65G 47/71
198/415
5,415,281 A * 5/1995 Taylor .................... B65G 47/31
198/448
5,531,311 A 7/1996 LeMay et al.
5,701,989 A * 12/1997 Boone .................. B65G 47/682
198/443
9,315,341 B2 * 4/2016 Leist ...................... B65G 47/31
9,555,982 B2 1/2017 Girtman et al.
2007/0221475 A1 9/2007 Halsey et al.
2014/0224622 A1 * 8/2014 German ................. B65G 47/22
198/790

* cited by examiner

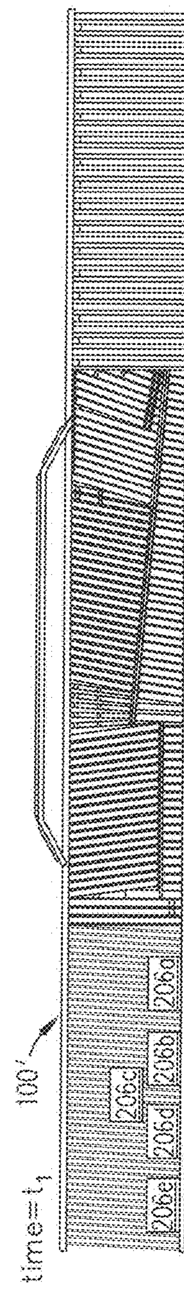
FIG. 10
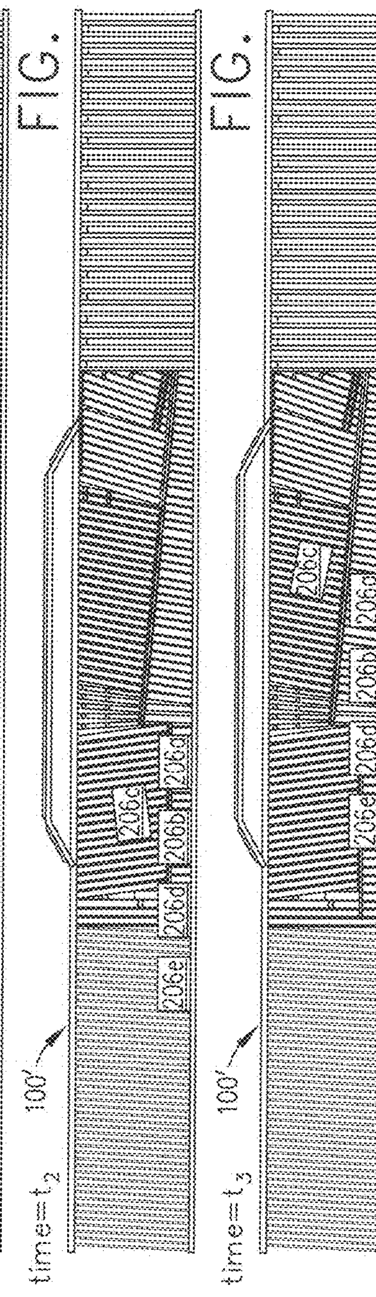
FIG. 11
FIG. 12
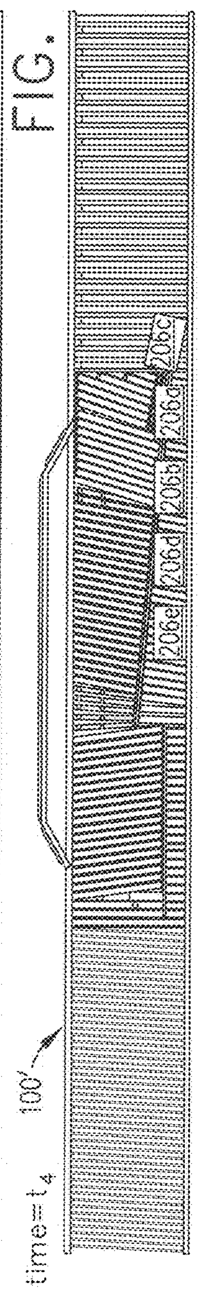
FIG. 13
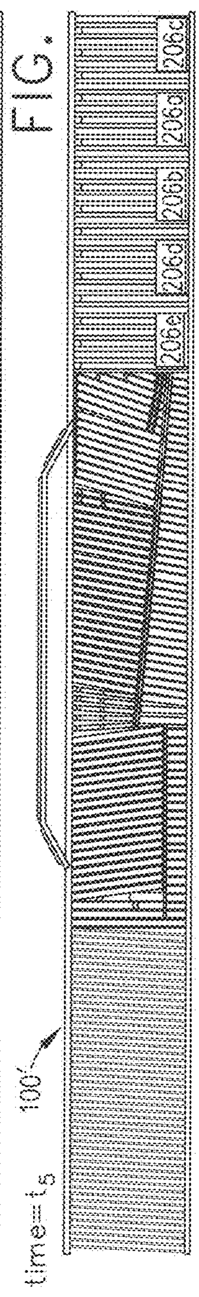
FIG. 14 time=$t_1$
100′
206e
206d
206c
206b
206a time=$t_2$
100′
206e
206d
206c
206b
206a time=$t_3$
100′
206e
206d
206c
206b
206a time=$t_4$
100′
206c
206e
206d
206b
206a time=$t_5$
100′
206c
206e
206d
206b
206a 2200
2202
2204
2206
2208
2210
2212
2214
2215
2216
2218
2220

2300
2302
2304
2306
2308
2310
2312
2314
2315
2316
2318
2320

SIDE-BY-SIDE REDUCER CONVEYOR

CLAIM OF PRIORITY

The present application claims the benefit of U.S. Provisional Patent Application Ser. No. 62/331,609 filed on 4 May 2016, entitled "Side-by-Side Reducer Conveyor", and assigned to the assignee, the disclosure of which is hereby incorporated by reference in its entirety.

BACKGROUND

1. Technical Field

The present disclosure relates generally to transportation conveyors of articles such as cartons and totes, and is particularly related to descrambling or unscrambling conveyors that cause articles to singulate during continuous operation.

2. Description of the Related Art

Descrambling or unscrambling conveyors have been used in material handling of containers such as cartons in order to singulate the cartons for accumulation, merging, sorting, etc. For example, U.S. Publ. No. 20070221475 A1, the disclosure of which is hereby incorporated by reference in its entirety, discloses an unscrambling conveyor having three lanes with the rollers of the outer lanes skewed toward the middle lane. The middle lane runs at a different speed than the outer lanes, and may have skewed rollers. The unscrambling conveyor may include several modules sequentially arranged, with a speed change within the lanes between the modules. The outer lanes are skewed to draw cartons into a faster running center lane to sequence cartons out in single file. However, two identical side-by-side cartons that straddle the center lane can be maintained in this arrangement without separating.

More recently in U.S. Pat. No. 9,315,341, issuing 19 Apr. 2016, the disclosure of which is hereby incorporation in its entirety, a merging conveyor system has a plurality of infeed staging conveyors configured to selectively feed batches of article arranged in a side by side configuration to a downstream merging conveyor. The merging conveyor is configured to merge batches of articles arranged in a side-by-side configuration and to singulate the individual articles of each batch while merging the batches as the articles are singulated while being advanced downstream as a flow of in-line separated articles. The merging conveyor includes a plurality of laterally spaced lanes of conveying surfaces which having a respective speed and each imparting an inward lateral force on the articles. A descrambling conveyor is disposed downstream of the merging conveyor.

While the disclosed conveyor system is effective for singulating three side-by-side cartons, it would be desirable to have a descrambling apparatus that could singulate side-by-side cartons in a much shorter configuration. A shorter apparatus would generally correlate to a much more economical solution, requiring less equipment and less floor space.

BRIEF DESCRIPTION OF THE FIGURES

FIGS. 10-14 illustrate a top view of a sequence of testing with five cartons on the second example SSR conveyor with a second speed that is faster than a first speed, according to one or more embodiments;

DETAILED DESCRIPTION

Figure 1A:
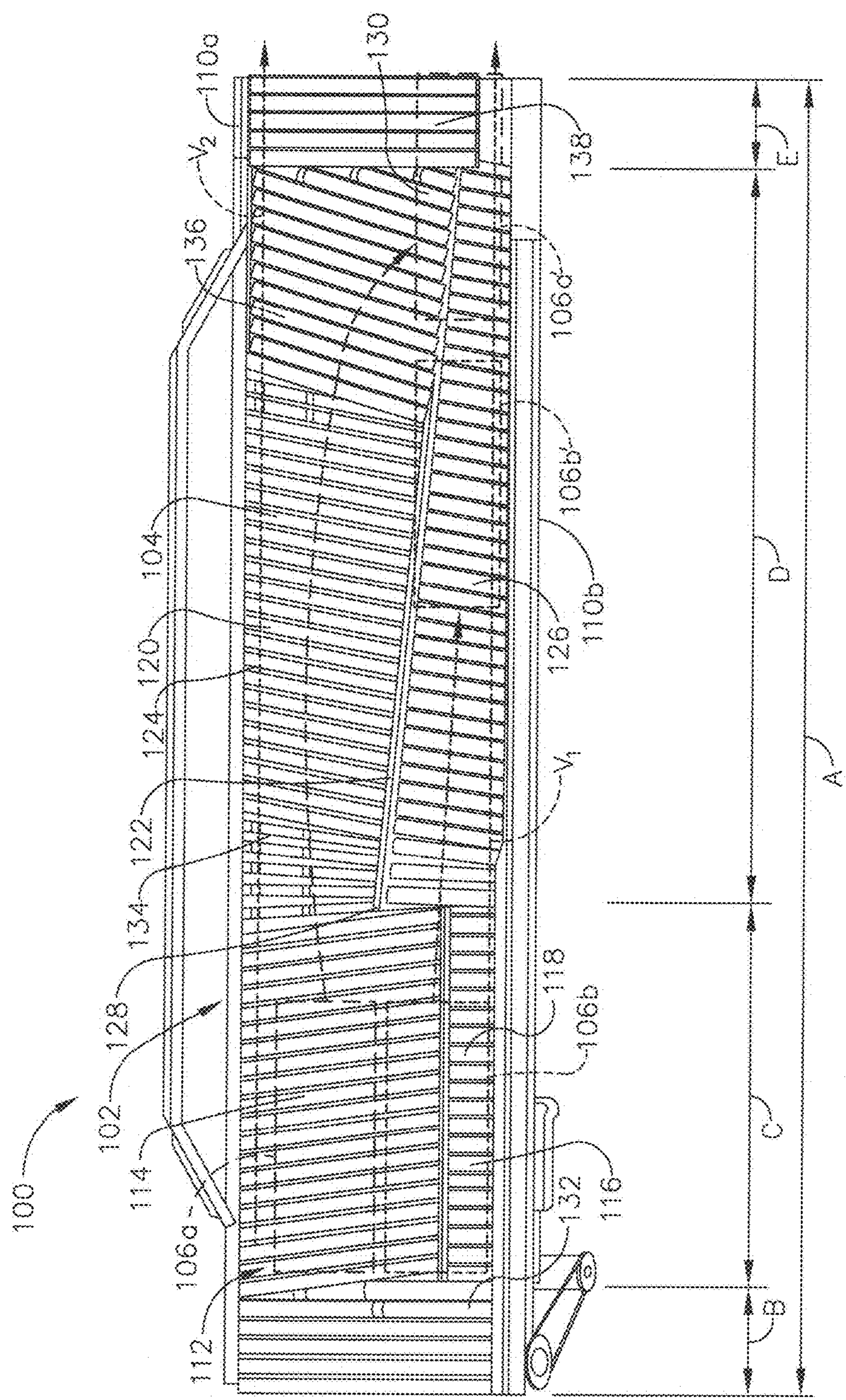
FIG. 1A illustrates a top view of a first example Side-by-Side Reducer (SSR) conveyor, according to one or more embodiments.

The present innovation provides for a side-by-side reducer conveyor that can singulate cartons that have a long longitudinal surface in close contact. Such frictional contacts tends to hamper accelerating one of the two cartons away from the other along the longitudinal axis of the conveyor. Instead, in input section of the side-by-side reducer conveyor pulls one of the two side-by-side cartons away from the other. The pulled away carton is accelerated to a much greater longitudinal speed and then driven back in line with the other carton that was not pulled away and accelerated.

In one or more embodiments, driven rollers are split across the width in a variable relationship, creating zones, divided and supported by a fixed rail. Each of the adjacent zones run a different speed causing a separation of cartons with regards to direction of travel. The rollers in the initial section of the conveyor are mounted to have an opposing skew, therefore pulling side by side cartons traveling across the infeed zone away from each other. Subsequent rollers in the conveyor section are skewed in a like direction to drive cartons into a single file line. The combination of lateral carton separation, alternate carton speeds and subsequent like skewing of driven rollers eliminates side by side cartons and creates a single file flow.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Turning to the drawings, FIG. 1A illustrates a first example side-by-side reducer (SSR) conveyor 100 that has a power driven conveyor bed 102 of rollers 104 that receives randomly positioned and side by side oriented left and right cartons 106*a*-106*b* and discharges them in a single file fashion. Driven rollers 104 are skewed in relationship to left and right conveyor side frames 110*a*-110*b* in an input section 112 having a larger left zone 114 of parallel and leftward skewed driven rollers 104 that laterally separates the left carton 106*a* from the right carton 106*b*. A right zone 116 is laterally sized to underlay at least a portion of the right carton 106*b* that is input close to the right conveyor side frame 110*b*. The driven rollers 104 of the right zone 116 are not skewed, tending to convey the rightward carton 106*b* longitudinally straight ahead at a nominal, unaccelerated speed. A straight mid-frame 118 of the input section 112 is longitudinally aligned and closer to the right conveyor side frame 110*a*. The straight mid-frame 118 provides an inward attachment point for the respective driven rollers 104 of the left zone 114 and the right zone 116 whose other ends attach respectively to the left and right conveyor side frames 110*a*-110*b*.

Cartons 106*a*-106*b* that are separated by the input section 112 then enter a combining section 120 that can be longer than the input section 112. An angled mid-frame 122 separates a left converging zone 124 from a right converging zone 126. The angled mid-frame 122 has an upstream end 128 that is approximately laterally centered and has a downstream end 130 that relatively close to the right side frame 110*b*, terminating in lateral alignment with the straight mid-frame 118. Driven rollers 104 of the left converging zone 124 and the right converging zone 126 have an inner end attached to the angled mid-frame 122 and a respective outer end attached respectively to the left and right conveyor side frames 110*a*-110*b*. The driven rollers 104 of the left converging zone 124 operate at a higher speed than the driven rollers 104 of the right converging zone 126. In an exemplary embodiment, the driven rollers 104 of the left converging zone 124 have a slighter greater rightward skew than the driven rollers 104 of the right converging zone 126 in order to compensate for a greater lateral distance of movement necessary for the left carton 106*a*. After reduction, carton 106*a*' is ahead of carton 106*b*'.

It should be appreciated that for clarity the SSR conveyor 100 is depicted and described as having cartons that end up singulated on a right lateral side; however, an SSR conveyor can be mirrored in orientation to singulate to the left side. Driven rollers 104 any combination of Motor Driven Rollers (MDR), unpowered rollers coupled by an O-band or drive-belt to a powered roller, drive belt driven rollers, external direct drive from a pulley, etc. In other embodiments, the speeds can be selected such that cartons that are separated and then converged can be longitudinally translated at a lower speed, resulting in converging behind the cartons that longitudinally translate in a straight path.

In an exemplary embodiment, the SSR conveyor 100 has a full longitudinal length A of about 12'. Describing from most upstream to most downstream, the SSR conveyor 100 includes a full-width entry stage 132 having a longitudinal length B of about 12'. The driven rollers 104 of the entry stage 132 have 0° skew and operate at a longitudinal rate $V_2$ of 480 fpm. The SSR conveyor 100 has an input section 112 having a longitudinal length C of about 40'. The larger left zone 114 has driven rollers 104 skewed leftward at 80 and operating at 480 fpm. The smaller right zone 116 has driven rollers 104 having 0° skew and that operate at a longitudinal rate $V_1$ of 240 fpm, thus half of the longitudinal rate of the larger left zone 114. The SSR conveyor 100 has a combining section 120 having a longitudinal length D of about 80'. The left converging zone 124 of the combining section 120 includes an upstream two-thirds portion 134 of the driven rollers 104 that have a 10° rightward skew and a downstream one-thirds portion 136 of the driven rollers 104 that have a 15° rightward skew, with both portions operating at 480 fpm. The right converging zone 126 of the combining section 120 has driven rollers 104 skewed rightward at 8° and operating at 240 fpm. The angled mid-frame 122 of the combining section 120 angles to the right by 5° from a longitudinal axis. The SSR conveyor 100 has a full-width exit stage 138 having a longitudinal length E of about 12' with 0° skew and operating at 240 fpm.

Figure 1B:
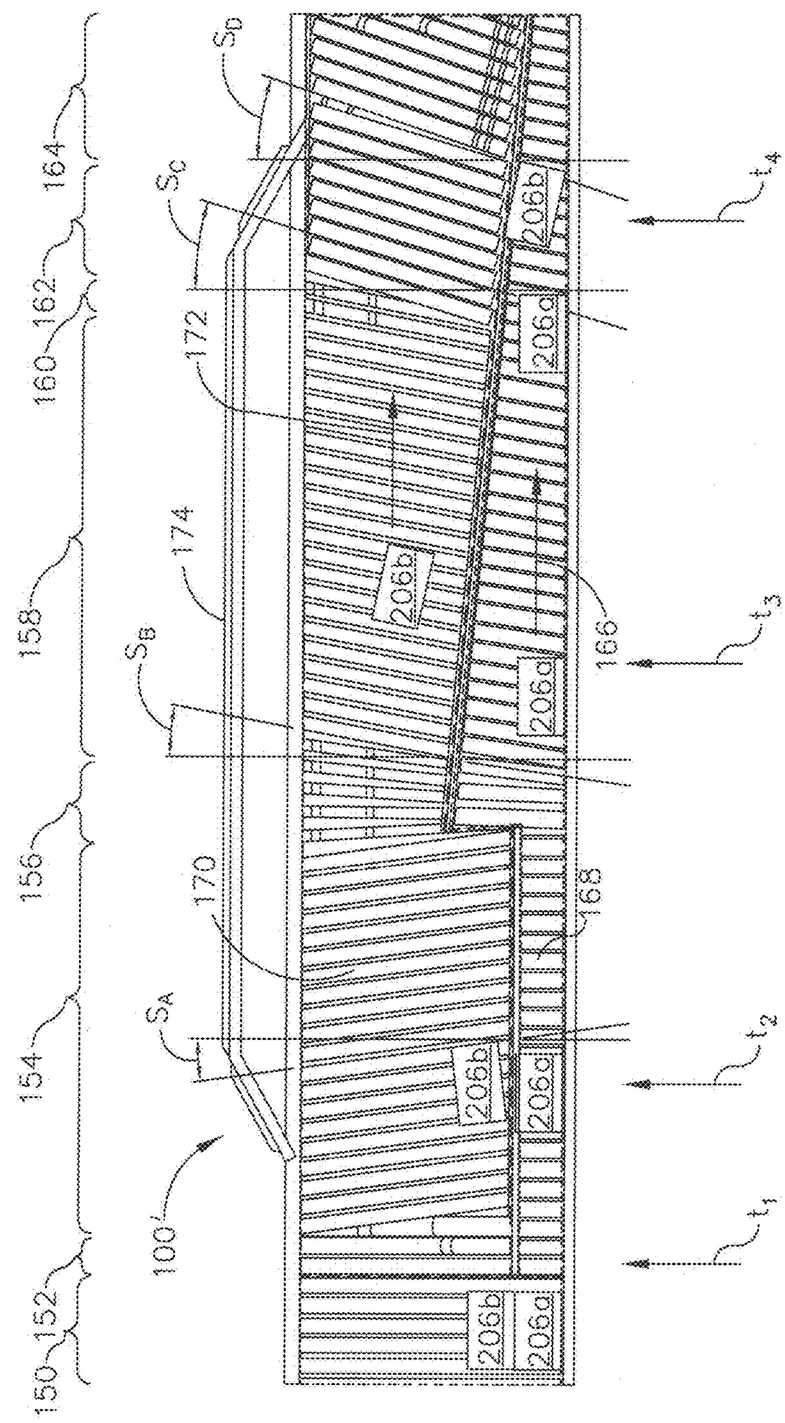
FIG. 1B illustrates a top view of a second example SSR conveyor, according to one or more embodiments.

FIG. 1B illustrates a second example SSR conveyor 100' built and tested to confirm singulation of side-by-side cartons in a continuous conveying operation. For clarity, the SSR conveyor 100' is annotated as having longitudinal portions 150-164 that are ordered from most upstream to most downstream. In each zone 150-164, a right carton 206*a* encounters a first longitudinal speed 166 in a right-side path 168 such as 220 fps as indicated at times $t_1$-$t_4$. Initially, right carton 206*a* experiences unskewed rollers in zones 150-154. Right carton 206*a* then experiences rightward skewed rollers in zones 156-164 that merely maintain the right carton 206*a* against a right side of the SSR conveyor 100'. By contrast, other than in the first zone 150, left carton 206*b* largely remains within a left-side path 170 of partial lateral width rollers that operate at a second longitudinal speed 172 that is different from the first longitudinal speed 166, such as 440 fps. The left-side path 170 includes skew angles that change in succession of longitudinal zones 152-164 as the left carton 206*b* is separated, accelerated, and urged against the right side rail in front of the right carton 206*a*. In zone 152, rollers on the left-side path 170

In the first portion 150 that is most upstream, the right and left cartons 206*a*, 206*b* at time $t_1$ are side-by-side and touching along their longitudinal length. Both cartons 206*a*, 206*b* encounter full-width perpendicular rollers without lateral skew. No force is asserted on the right and left cartons 206*a*, 206*b* to separate or singulate the cartons 206*a*, 206*b*. In the second zone 152, cartons 206*a*, 206*b* may present a frictional resistance that is not overcome as the left carton 206*b* begins to experience rollers at a different speed than the right carton 206*a* in respective left and right paths 170, 168. For clarity, left-side path 170 is described herein as immediately reaching a longitudinal speed that is double that of the right-side path 168. However, to maintain frictional engagement with the left carton 206*b*, individual roller speeds can be set to have more of a ramped speed difference. In addition, roller can have enhanced frictional coatings or sleeves to transfer accelerations to the left carton 206*b*. In third zone 154 of the left-side path 170, the rollers transition to a leftward skew $S_A$ such as—7.8° from the perpendicular as viewed. Thus, the left carton 206*b* at time $t_2$ is pulled leftward away from the right carton 206*a* to avoid any longitudinal friction between cartons 206*a*, 206*b*. Beginning in the third zone 154 and continuing to the sixth zone 160 is a left-side retaining guide 174 that allows either a leading or trailing edge of the left carton 206*b* to extend off of the left-side path 170, enabling long cartons on the left side to rotate without contacting any impediment. In a fourth zone 156, the skew of the rollers in the left-side path 170 transitions from leftward skew to rightward skew. In the fifth zone 158, the left carton 206*b* has completed its leftward separation from the right carton 206*a* and is beginning to be skewed back to the right at an angle $S_B$ such as +7.9° from the perpendicular as viewed. The higher longitudinal speed causes the left carton 206*b* to advance ahead of the right carton 206*a* as depicted at time $t_3$. In the sixth zone 160 the rightward skew transitions to higher rightward skew $S_C$ such as +12.6° from the perpendicular as viewed in the seventh zone 162. In the seventh zone 164, the rightward skew increases to $S_D$ such as +14.30° from the perpendicular as viewed, ensuring that at time $t_4$ that the left carton 206*b* is now singulated against the right side and in front of the right carton 206*a*.

Figure 2:
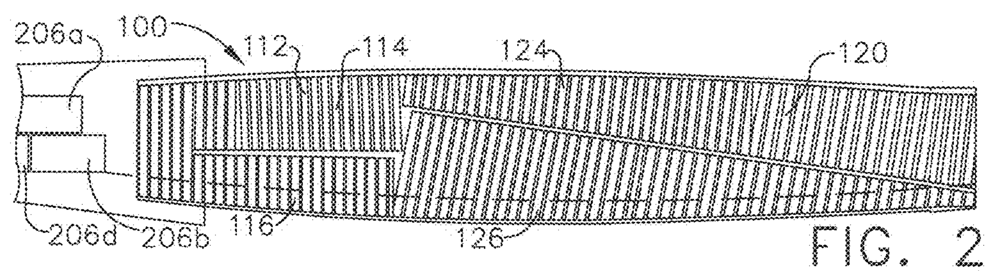
FIGS. 2-6 illustrate sequential top views of testing of two sets of two long side-by-side cartons reduced by the first example SSR conveyor to a singulated set, according to one or more embodiments.
Figure 3:
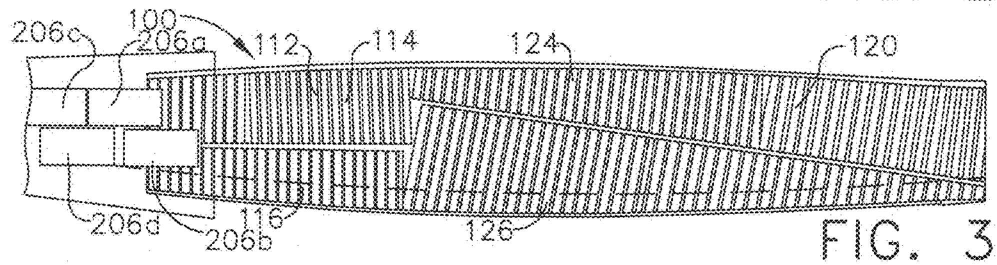
Figure 4:
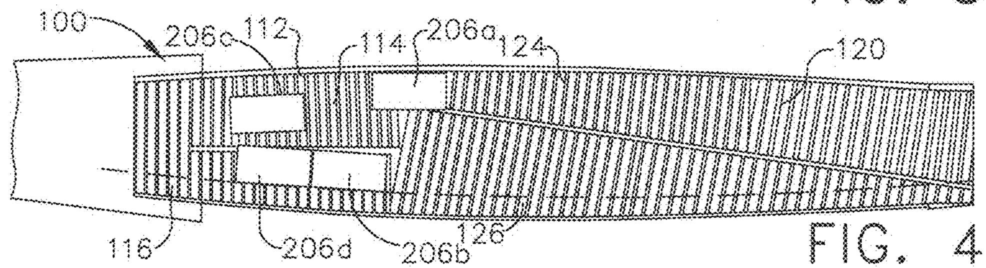
Figure 5:
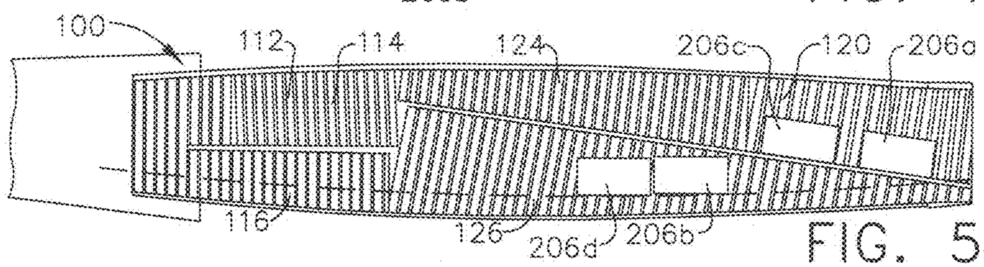
Figure 6:
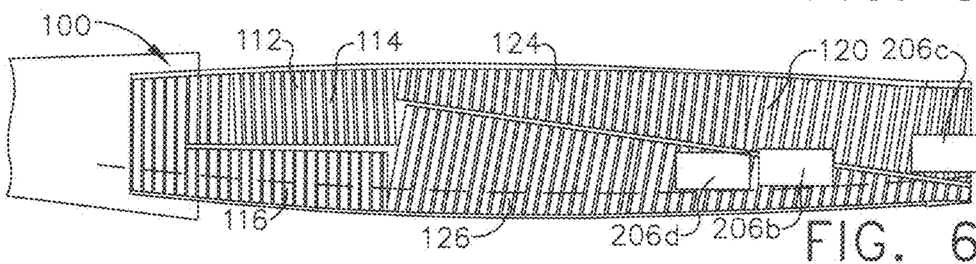

Testing of the prototype first SSR conveyor 100 was conducted for a range of carton sizes and orientations to one another to validate the embodiment. FIGS. 2-6 are images derived from a video recording of one particular test run having long cartons 206*a*-206*d*. Due to using a wide angle lens, the depiction is distorted. In FIGS. 2-3, a downstream pair of left and right cartons 206*a*-206*b* were side by side and in close lateral contact. With a small gap from the downstream pair, an upstream pair of left and right cartons 206*c*-206*d* (the latter seen in FIG. 3) were side by side and in close lateral contact. FIG. 4 illustrates the left cartons 206*a*, 206*c* being respectively laterally separated from and longitudinally accelerated away from right cartons 206*b*, 206*d*. FIG. 5 illustrates the left cartons 206*a*, 206*c* converging to the right at a higher longitudinal speed than the right cartons 206*b*, 206*d*. FIGS. 5-6 illustrate that the relative speeds in the input section 112 between the left zone 114 and the right zone 116 and the relative speeds in the combining section 120 between the left converging zone 124 and the right converging zone 126 provided sufficient longitudinal separation that both left cartons 206*a*, 206*e* to singulate in front of both right cartons 206*b*, 206*d*.

Figure 7:
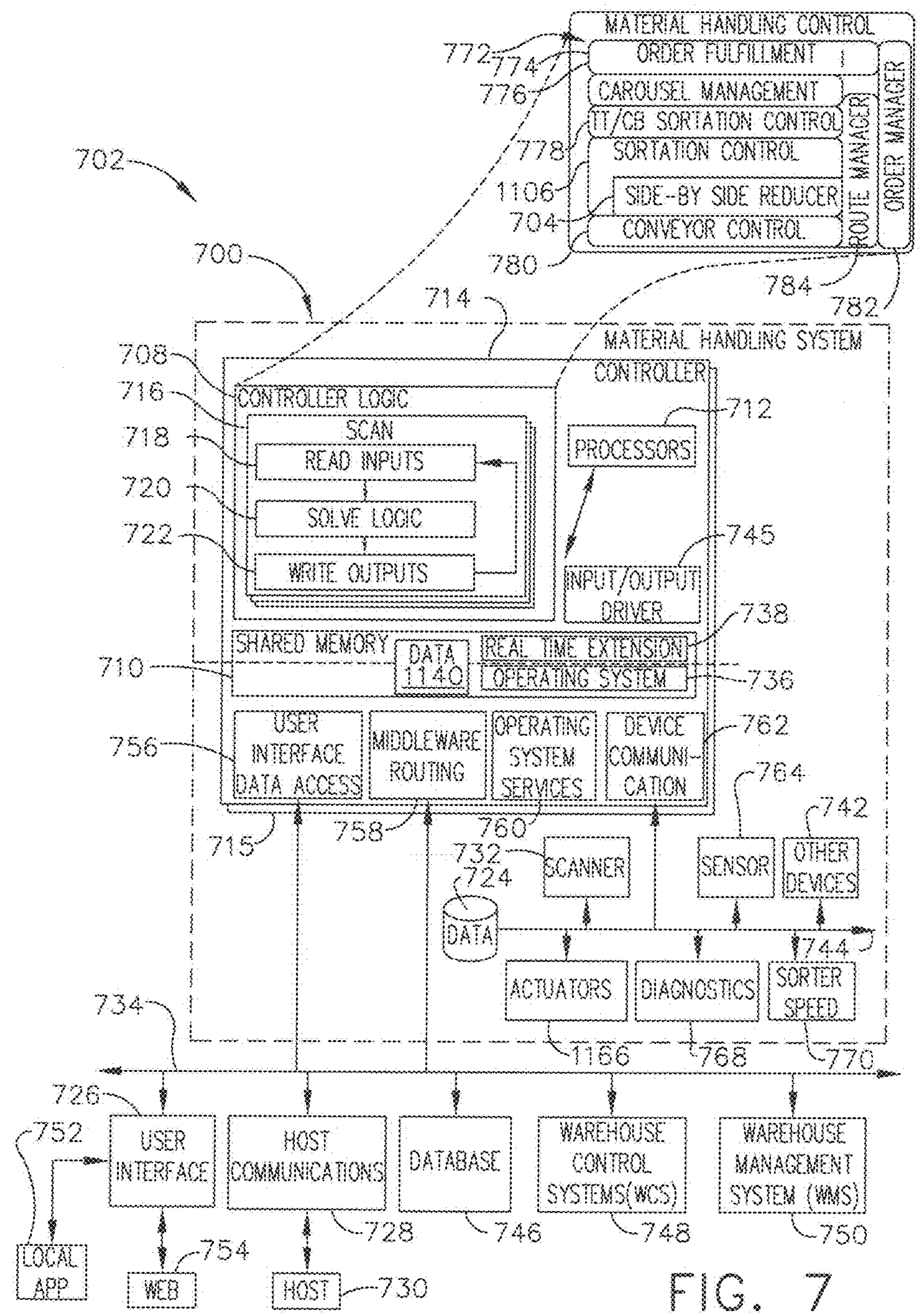
FIG. 7 illustrates a block diagram of an exemplary computing environment for executing the method of side-by-side reduction by a conveyor, according to one or more embodiments.

In FIG. 7, an exemplary material handling system 700 of a distribution center processing architecture 702 is depicted wherein an SSR conveyor controller 704 is implemented, such as being a downstream section controlled by a sortation control 706. Controller logic 708 stored in computer-readable, shared memory 710 is executed by processors 712 in a controller 714 of the material handling system 700. One function of the controller logic 708 can be machine control logic. The controller 714 can be a primary controller supported by a backup controller 715 such that maintenance personal could swap cables or connections in the event of a failure without undue service downtime. Alternatively, a supervising system or the self-diagnostics could cause automatic switching between primary and backup in the event of a failure.

Scan logic, or merely a scan 716, refers to an implementation within the controller logic 708 wherein the processors 712 repeatedly execute a read input component 718, a solve logic component 720, and a write outputs component 722. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 720 can incorporate IF-THEN-ELSE branching logic, motion control, simple to sophisticates, hardlined to configured. Data, used by the solve logic component 720, can reside in the computer-readable, shared memory 710 or a data store device 724 (e.g., local, remote, cloud-based, etc.). A user interface 726 can be used to modify the solve logic component 720 such as by changing values that change the configuration or operation.

As is conventionally understood, the controller logic 708 can receive binary type inputs (e.g., switches, photo eyes, etc.) and generate binary type outputs (e.g., motor contacts, solenoid valves, lamp actuations, etc.). For example, in such an implementation, the user interface 726 can entail at least in part push button controls and lamps. More recent developments for controller logic 708 can include RS232 serial devices with cathode ray tube (CRT) screens and keyboards that enable dialog screens and data display along with printers for generating reports. Barcode scanning can detect items processed by the material handling system 700. More recently, wired and wireless communication within the material handling system 700 and distribution center processing architecture 702 enable more distributed and remotely isolated implementations. For example, such communication architectures may employ bus couplers such a PROFIBUS and ETHERCAT.

The scan 716 can be one of many control scans to support increased speeds and complexities for portions of the material handling system 700. Certain logic is required to be performed during shorter intervals than others and so the scans 716 can have different periodicities, often selected for convenience to occur as multiples of the shortest duration scan 716. Examples include scans 716 of 1 ms and 2 ms for motion control, 7 ms for a merge subsystem, and 211 ms for general conveyor.

The material handling system 700 can incorporate host communications 728 to a host system 730 using serial ports, Ethernet, file transfer protocol (FTP), Transfer Control Protocol/Internet Protocol (TCP/IP), etc. Thereby, the host system 730 can make decisions for the material handling system 700. For example, a scanner 732 can see a barcode. The barcode is sent to the host system 730, such as via a bridge 734. The host system 730 responds with a destination. In response, the material handling system 700 causes the item with the barcode to go to that destination. Alternatively, the process can entail receiving a batch or download of destinations mapped to barcodes as part of a lookup table (LUT) for reference by the material handling system 700.

The computer-readable shared memory 710 can allow execution of an operating system (e.g., Windows, LINX, etc.) 736 to execute with a real time extension 738. The real time extension 738 assures that the machine control logic (controller logic 708) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 740 from these communications is stored in computer-readable shared memory 710 for use in control decisions and for display on user interface 726. In an exemplary version, the data 740 is not controlled by the real time extension 738. In a similar fashion, other communicating devices 742 used in the control process (e.g., scales, printers) are connected via a private internal communications bus (e.g., Ethernet) 744 to the processors 712. The controller 714 can also have internal input/output drivers 745 to interface using specific communication protocols.

The distribution center processing architecture 702 can include other systems external to the material handling system 700 that communicate via the bridge 734, such as a database 746, a warehouse control system (WCS) 748, and a warehouse management system (WMS) 750. In addition, the user interface 726 can facilitate remote or automated interaction via the user interface 726, depicted as a local application 752 and a web application 754. The controller 714 can include specific interfaces to support this interaction, such as a user interface data access component 756 to interact with user interface 726, middleware routing component 758 to interface with other external systems. Operating system services 760 and a device communication component 762 can also support the communications, such as sensors 764, actuators 766, diagnostic systems 768, and a sorter speed control 770.

The controller logic 708 can be functional described as material handling control layers 772 of software functionality, such as the sortation control 706, that address certain subsystems within a distribution center: order fulfillment 774, carousel management 776, tilt tray/cross belt (TT/CB) control 778, conveyor control 780, order manager 782 and route manager 784.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For example, running average carton length can be used. Then, after a reset, the expected average for the ten minute timer can be used. The same approach can be used for the one (1) minute average for recirculation. Alternatively or in addition, inter-slug gap can be considered in the calculation.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

Figure 8:
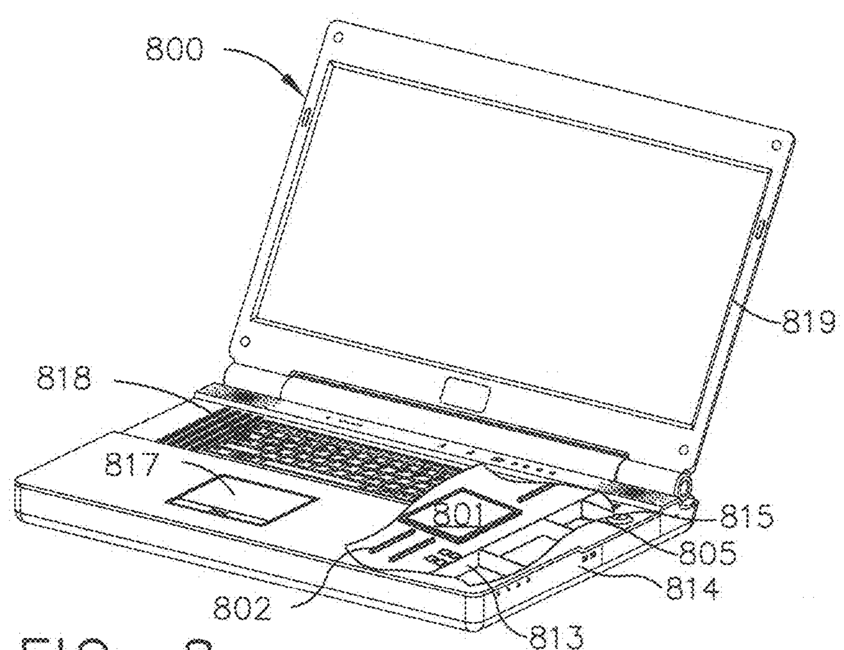
FIG. 8 illustrates a depiction of an isometric view of a laptop computer for executing instructions to perform side-by-side reduction, according to one or more embodiments.

The various embodiments may be implemented in any of a variety of computing devices, an example of which is illustrated in FIG. 8. A computing device 800 will typically include a processor 801 coupled to volatile memory 802 and a large capacity nonvolatile memory, such as a disk drive 805 of Flash memory. The computing device 800 may also include a floppy disc drive 813 and a compact disc (CD) drive 814 coupled to the processor 801. The computing device 800 may also include a number of connector ports 815 coupled to the processor 801 for establishing data connections or receiving external memory devices, such as a USB or FireWire™ connector sockets, or other network connection circuits for establishing network interface connections from the processor 801 to a network or bus, such as a local area network coupled to other computers and servers, the Internet, the public switched telephone network, and/or a cellular data network. The computing device 800 may also include the trackball or touch pad 817, keyboard 818, and display 819 all coupled to the processor 801.

Figure 9:
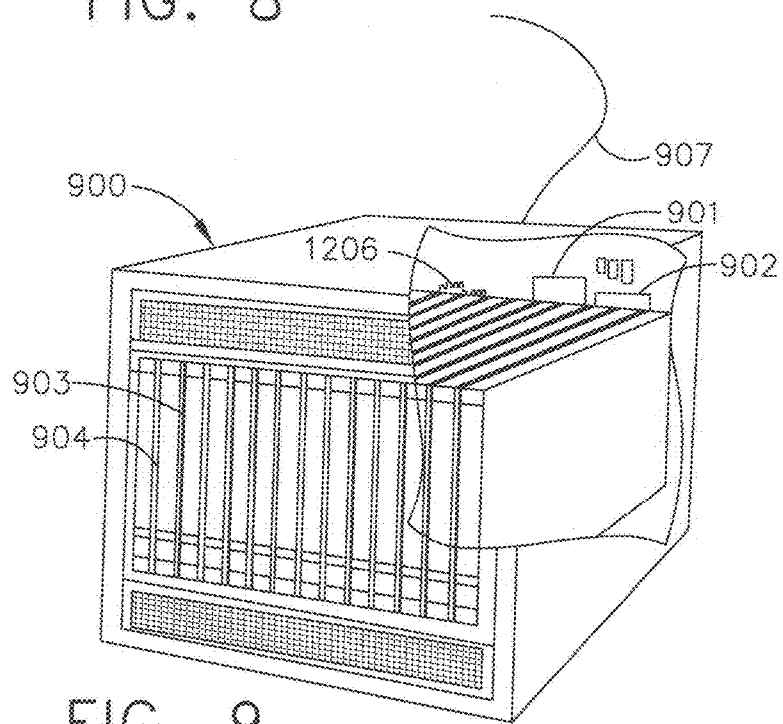
FIG. 9 illustrates a depiction of an isometric view of a server information handling system for executing instructions to perform side-by-side reduction, according to one or more embodiments.

The various embodiments may also be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other computers and servers, the Internet, the public switched telephone network, and/or a cellular data network.

FIGS. 10-14 illustrate that the second example SSR conveyor 100' can overcome having an adjacent carton laterally touching one or more other cartons. FIG. 10 illustrates an example challenging situation at time $t_1$ of having four right-side, singulated cartons 206*a*, 206*b*, 206*d*, 206*e* with a left-side carton 206*c* that is against cartons 206*b*, 206*d*. The length of the cartons 206*a*-206*e* and the relative speeds of the rollers are selected such that left-side carton 206*c* can accelerate ahead of the downstream most carton 206*a*. In particular, FIG. 11 illustrates at time $t_2$ that carton 206*c* has laterally separated from cartons 206*b*, 206*d* and has moved longitudinally to be abreast of the gap between cartons 206*a*, 206*b*. FIG. 12 illustrates at time $t_3$ that carton 206 has begun to be skewed back to the right as carton 206*c* passes ahead of the first carton 206*a*. FIG. 13 illustrates at time $t_4$ that carton 206*c* is completing being skewed to the right ahead of carton 206*a*. FIG. 14 illustrates at time $t_5$ that cartons 206*a*-206*e* are fully singulated and are being conveyed off of the SSR conveyor 100'.

Figures 15, 16, 17, 18, 19:
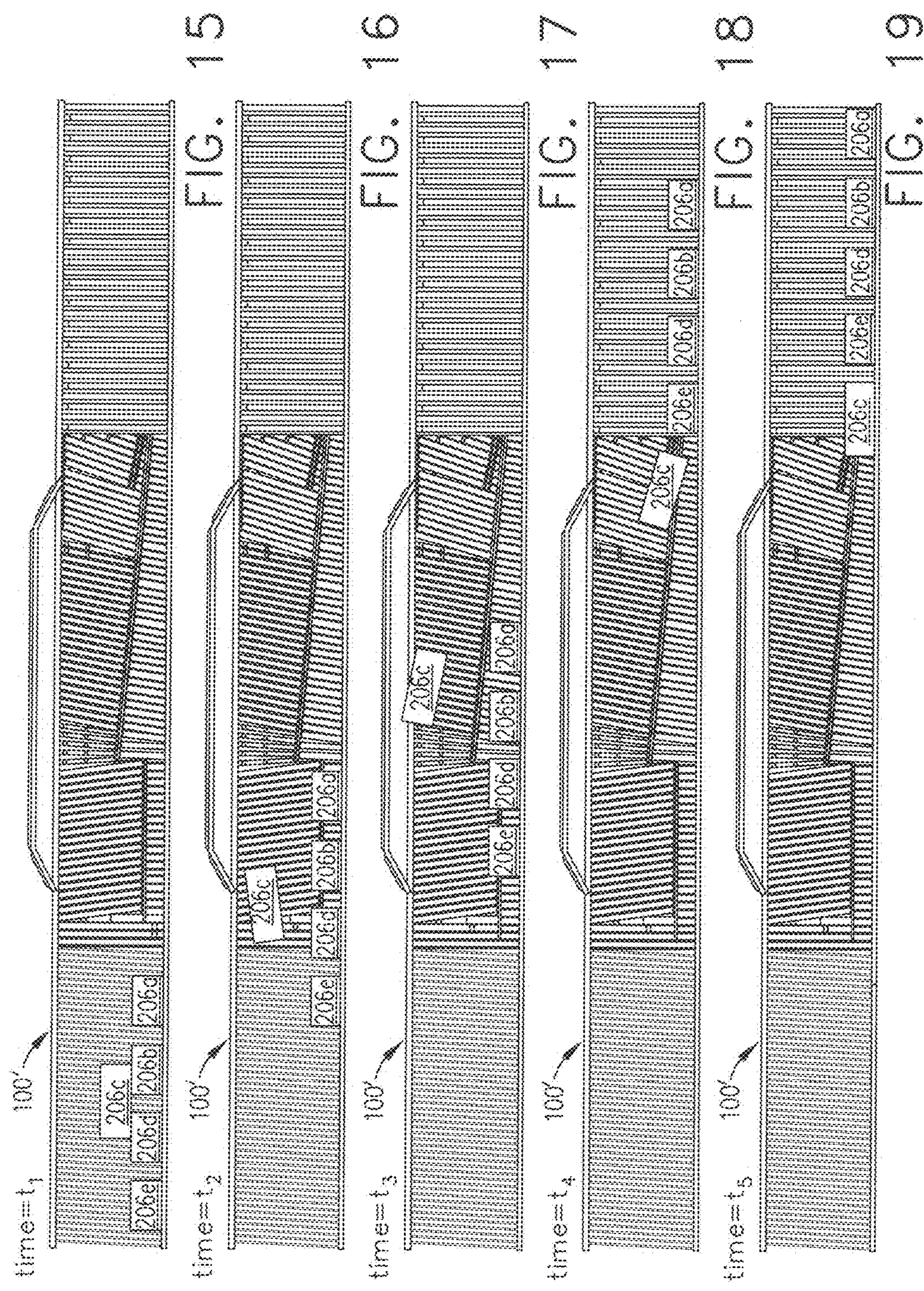
FIGS. 15-19 illustrate a top view of a sequence of testing with five cartons on the second example SSR conveyor with a second speed that is slower than a first speed, according to one or more embodiments.

FIGS. 15-19 illustrate that the second example SSR conveyor 100' can overcome having an adjacent carton laterally touching one or more other cartons. FIG. 15 illustrates an example challenging situation at time $t_1$ of having four right-side, singulated cartons 206*a*, 206*b*, 206*d*, 206*e* with a left-side carton 206*c* that is against cartons 206*b*, 206*d*. The length of the cartons 206*a*-206*e* and the relative speeds of the rollers are selected such that left-side carton 206*c* can decelerate behind the upstream most carton 206*e*. In particular, FIG. 16 illustrates at time $t_2$ that carton 206*c* has laterally separated from cartons 206*b*, 206*d* and has moved longitudinally to be abreast of the gap between cartons 206*d*, 206*e*. FIG. 17 illustrates at time $t_3$ that carton 206*c* has begun to be skewed back to the right as carton 206*c* passes behind the last carton 206*e*. FIG. 18 illustrates at time $t_4$ that carton 206*c* is completing being skewed to the right behind carton 206*e*. FIG. 19 illustrates at time $t_5$ that cartons 206*a*-206*e* are fully singulated and are being conveyed off of the SSR conveyor 100'.

Figure 20:
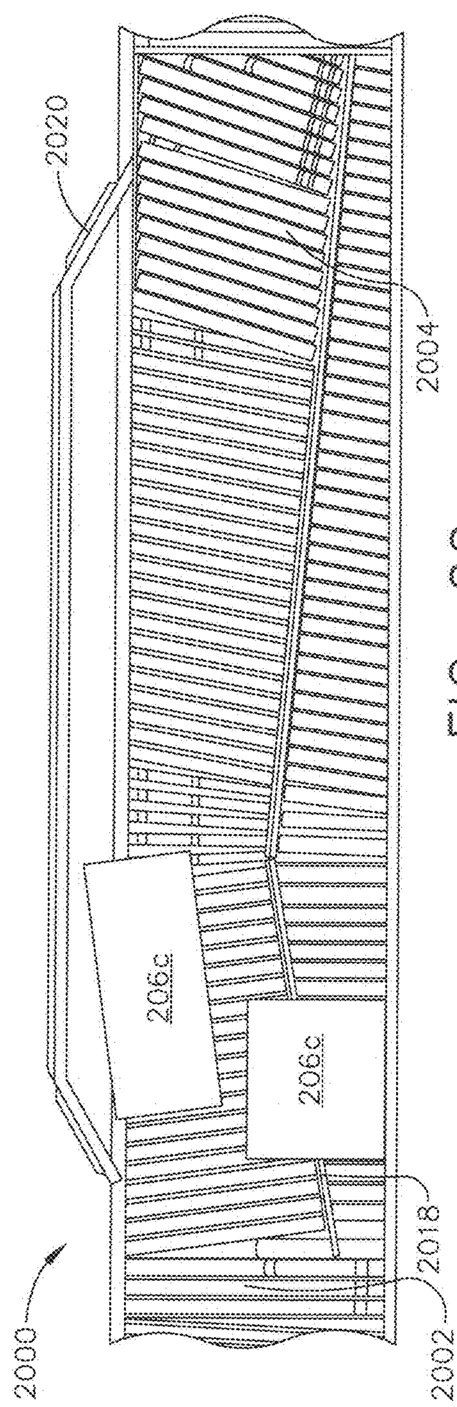
FIG. 20 illustrates a top view of a third example SSR conveyor, according to one or more embodiments.
Figure 21:
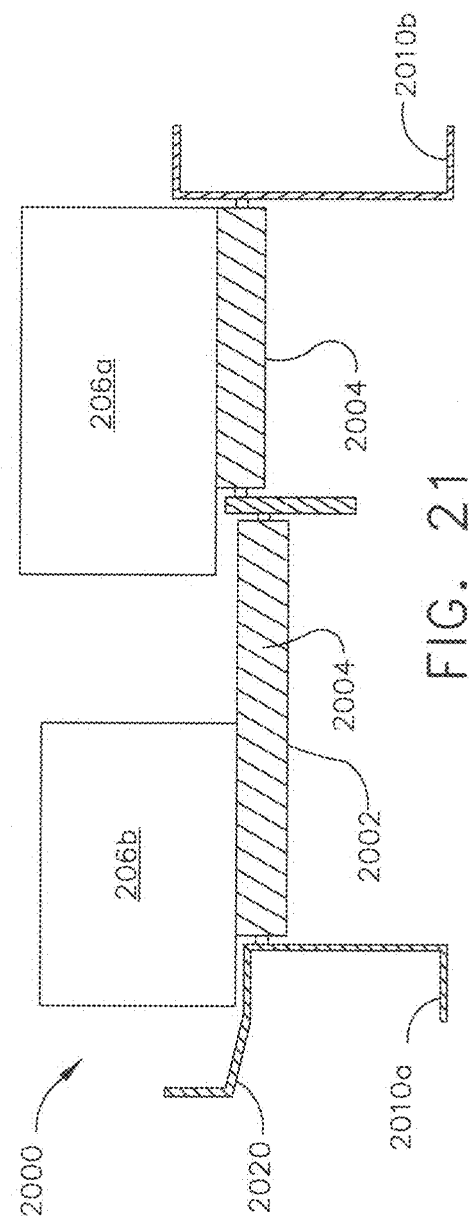
FIG. 21 illustrates a back, cross sectional view of the third example SSR conveyor of FIG. 20, according to one or more embodiments.

FIGS. 20-21 illustrate a third example SSR conveyor 2000 that has a power driven conveyor bed 2002 of rollers 2004 that receives randomly positioned and side by side oriented left and right cartons 2006*a*-2006*b* and discharges them in a single file fashion. Driven rollers 2004 are skewed in relationship to left and right conveyor side frames 2010*a*-2010*b* in an input section 2012 having a larger left zone 2014 that diminishes in width going downstream. Left zone 2014 includes parallel and leftward skewed driven rollers 2004 that laterally separates the left carton 2006*a* from the right carton 2006*b*. A right zone 2016 is laterally sized to underlay at least a portion of the right carton 2006*b* that is input close to the right conveyor side frame 2010*b*. The right zone 2016 increases in lateral width to correspond to the diminishing in lateral width of the left zone 2014. Adjacent ends of the rollers 2004 in the left and right zones 2014, 2016 are supported by a midframe 2018 that angles from the first zone toward the second zone Right carton 2006*b* would tend to remain fully on the widening lateral width of the right zone 2016 and thus would not tend to rotate due to partial contact with the left zone 2014. The left carton 2006*a* is allowed to partial rotate into a carton retaining guide offset 2020 that extends from the left conveyor side frame 2010*a*.

FIG. 21 illustrates that the rollers 2004 of the left zone 2014 can be vertically lower than the roller 2004 of the right zone 2016. Thus, the right carton 2006*a* that has most of its lateral width supported on the right zone 2016 will not contact the left zone 2014. Thus the right carton 2006*a* does not encounter the different speed of the rollers 2004 of the left zone 2014 and is not turned.

Figures 22, 23:
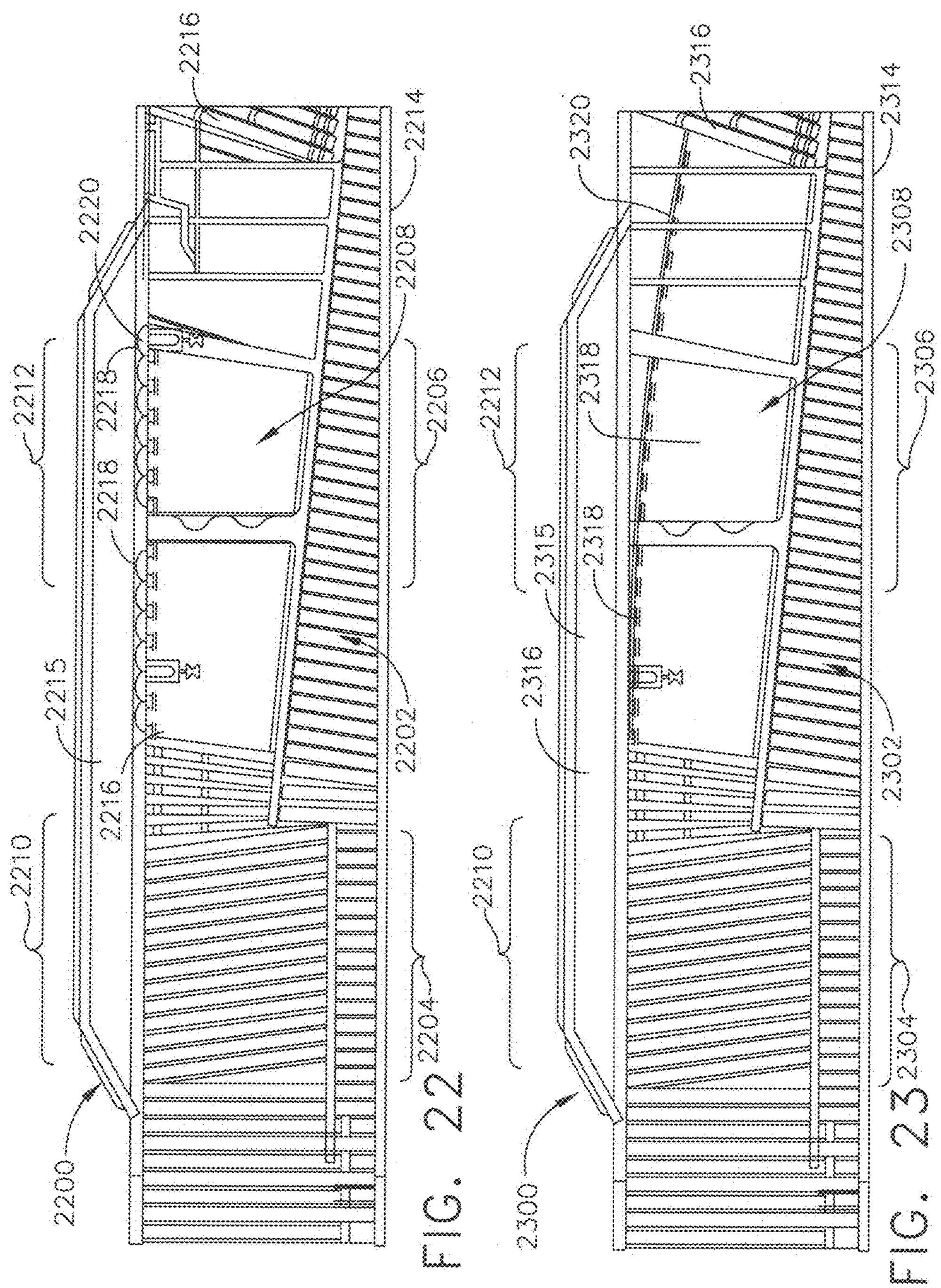
FIG. 22 illustrates a top view of an example SSR conveyor with rollers removed to expose a straight row of drive belt pulleys, according to one or more embodiments.
FIG. 23 illustrates a top view of an example SSR conveyor with rollers removed to expose a curved row of drive belt pulleys, according to one or more embodiments.

FIG. 22 illustrates an SSR conveyor 2200 having a first path 2202 with an upstream first zone 2204 and a downstream third zone 2206. The SSR conveyor 2200 has a second path 2208 with an upstream second zone 2210 and a downstream fourth zone 2212. The first and third zones 2204, 2206 generally have no skew or a slight skew toward an adjacent first side frame 2214 to maintain any singulated cartons (not shown) in the first path 2202. The third zone 2210 skews any adjacent carton (not shown) in the second path 2208 away from the first zone 2204 in the first path 2202 toward a second side frame 2215. Then the fourth zone 2212 skews toward the third zone 2206 in first path 2202. In one or more embodiments, an amount of skew and speed of rollers 2216 in the second path 2208 can be limited enabling use of longitudinally aligned row of drive belt pulleys 2218 that guide a straight drive belt 2220 (in phantom). The straight drive belt 2220 drives one or more rollers 2216 in the second path 2208.

FIG. 23 illustrates an SSR conveyor 2300 having a first path 2302 with an upstream first zone 2304 and a downstream third zone 2306. The SSR conveyor 2300 has a second path 2308 with an upstream second zone 2310 and a downstream fourth zone 2312. The first and third zones 2304, 2306 generally have no skew or a slight skew toward an adjacent first side frame 2314 to maintain any singulated cartons (not shown) in the first path 2302. The third zone 2310 skews any adjacent carton (not shown) in the second path 2308 away from the first zone 2304 in the first path 2302 toward a second side frame 2315. Then the fourth zone 2312 skews toward the third zone 2306 in first path 2302. In one or more embodiments, in order to reduce frictional wear and noise generation and for less constraints on speed and skew angle of rollers 2316, a curved row of drive belt pulleys 2318 can guide a curved drive belt 2320 (in phantom). The curved drive belt 2320 drives one or more rollers 2316 in the second path 2308. A curve of the curved row of drive belt pulleys 2318 perpendicularly intersects each of the one or more rollers 2316 to avoid excessive noise and wear.

While the present embodiment of the invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A side-by-side reducer (SSR) conveyor comprising:

an elongate bed of rollers supported between left and right side frames and comprising a separating section and a combining section;

the separating section comprising a first zone and a second zone of rollers, the first zone being larger compared to the second zone and laterally adjacent to the second zone such that a first carton received side by side with a second carton is received on the first zone and the second carton is substantially received on the second zone, the first zone having rollers skewed away from the second zone to laterally separate the first carton from the second carton;

the combining section comprising a third zone and fourth zone of rollers that respectively receive the first and second carton from the first and second zones of rollers, the third zone skewed toward the fourth zone to laterally converge the first carton into longitudinal alignment with the second carton;

one or more roller driving components that operate the third zone of rollers at a different speed than the fourth zone to further longitudinally separate the first and second cartons prior to the first carton being laterally moved into longitudinal alignment with the second carton; and wherein the rollers in the first zone become progressively shorter going downstream in correspondence to the rollers in second zone becoming progressively longer, wherein adjacent ends of the rollers in the first and second zones are supported by a midframe that angles from the first zone toward the second zone.

2. The SSR conveyor of claim 1, wherein the one or more roller driving components operate at least one of the first zone and the third zone at a different speed respectively from the second zone and the fourth zone to longitudinally separate the first and second cartons.

3. The SSR conveyor of claim 2, wherein the one or more roller driving components operate the first and third zones at a faster speed respectively than the second and fourth zones to longitudinally separate the first carton from the second carton.

4. The SSR conveyor of claim 2, wherein the one or more roller driving components operate the first and third zones at a slower speed respectively than the second and fourth zones to longitudinally separate the first carton from the second carton.

5. The SSR conveyor of claim 1, further comprising a carton retaining guide offset adjacent to at least one of the first and third zones that provides space for carton rotation.

6. A side-by-side reducer (SSR) conveyor comprising:

an elongate bed of rollers supported between left and right side frames and comprising a separating section and a combining section;

the separating section comprising a first zone and a second zone of rollers, the first zone occupying a lateral portion of the separating section, the first zone being larger compared to the second zone and laterally adjacent to the second zone such that a first carton received side by side with a second carton is received on the first zone and the second carton is substantially received on the second zone, the first zone having rollers skewed away from the second zone to laterally separate the first carton from the second carton;

the combining section comprising a third zone and fourth zone of rollers that respectively receive the first and second carton from the first and second zones of rollers, the third zone skewed toward the fourth zone to laterally converge the first carton into longitudinal alignment with the second carton;

one or more roller driving components that operate the third zone of rollers at a different speed than the fourth zone to further longitudinally separate the first and second cartons prior to the first carton being laterally moved into longitudinal alignment with the second carton; and wherein rollers in the second zone are vertically lower than roller in the first zone to mitigate rotation of cartons in the first zone.

7. A side-by-side reducer (SSR) conveyor comprising:

an elongate bed of rollers supported between left and right side frames and comprising a separating section and a combining section;

the separating section comprising a first zone and a second zone of rollers, the first zone occupying a lateral portion of the separating section, the first zone being larger compared to the second zone and laterally adjacent to the second zone such that a first carton received side by side with a second carton is received on the first zone and the second carton is substantially received on the second zone, the first zone having rollers skewed away from the second zone to laterally separate the first carton from the second carton;

the combining section comprising a third zone and fourth zone of rollers that respectively receive the first and second carton from the first and second zones of rollers, the third zone skewed toward the fourth zone to laterally converge the first carton into longitudinal alignment with the second carton;

one or more roller driving components that operate the third zone of rollers at a different speed than the fourth zone to further longitudinally separate the first and second cartons prior to the first carton being laterally moved into longitudinal alignment with the second carton; and a row of drive belt pulls guide a drive belt in driving contact to one or more rollers in the fourth zone, the row of drive belts arranged in a curve that is perpendicular to each of the one or more rollers.

8. A side-by-side reducer (SSR) conveyor comprising:

an elongate bed of rollers supported between left and right side frames and comprising a first path and a second path that are laterally adjacent during at least a portion of the elongate bed wherein an inducted first carton is received in the first path with any laterally adjacent carton being received in the second path;

the first path comprising a first arrangement of rollers having a respective skew and respective roller speeds that maintains the first carton in the first path and that conveys the first carton down the first path in a first time interval;

the second path comprising a second arrangement of rollers laterally adjacent to the first arrangement of rollers and having an initial skew away from the first path to separate and a downstream skew toward the first path to consolidate, the rollers having respective roller speeds that conveys any adjacent carton in a second time interval that is different from the first time interval; and a row of drive belt pulleys that guide a drive belt in driving contact to one or more rollers in the second path, the row of drive belts arranged in a curve that is perpendicular to each of the one or more rollers.

9. The SSR conveyor of claim 8, wherein the second arrangement of rollers operates at a faster speed than the first arrangement of rollers.

10. The SSR conveyor of claim 8, wherein the second arrangement of rollers operates at a slower speed than the first arrangement of rollers.

11. The SSR conveyor of claim 8, further comprising a carton retaining guide offset that provides space for carton rotation in the second path.

* * * * *